United States Patent
Villegas et al.

(10) Patent No.: US 12,367,321 B2
(45) Date of Patent: Jul. 22, 2025

(54) SECURE ELEMENT FOR SECURELY PROCESSING DIGITAL INFORMATION

(71) Applicant: Nagravision Sàrl, Cheseaux-sur-Lausanne (CH)

(72) Inventors: Karine Villegas, Cheseaux-sur-Lausanne (CH); Roan Hautier, Cheseaux-sur-Lausanne (CH); Fabien Gremaud, Cheseaux-sur-Lausanne (CH); Pascal Fuchs, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 232 days.

(21) Appl. No.: 17/999,133

(22) PCT Filed: Apr. 27, 2021

(86) PCT No.: PCT/EP2021/060973
§ 371 (c)(1),
(2) Date: Nov. 17, 2022

(87) PCT Pub. No.: WO2021/233649
PCT Pub. Date: Nov. 25, 2021

(65) Prior Publication Data
US 2023/0205934 A1   Jun. 29, 2023

(30) Foreign Application Priority Data
May 20, 2020   (EP) .................................. 20175606

(51) Int. Cl.
G06F 21/71   (2013.01)
G06F 21/60   (2013.01)
G06F 21/64   (2013.01)

(52) U.S. Cl.
CPC ............ *G06F 21/71* (2013.01); *G06F 21/602* (2013.01); *G06F 21/64* (2013.01)

(58) Field of Classification Search
CPC ........ G06F 21/44; G06F 21/71; G06F 21/602; G06F 21/64; H04L 9/0897; H04L 9/3242; H04L 9/0869
(Continued)

(56) References Cited

U.S. PATENT DOCUMENTS

2006/0080553 A1   4/2006   Hall
2017/0083724 A1   3/2017   Chhabra et al.
(Continued)

FOREIGN PATENT DOCUMENTS

WO   WO 2017/052793 A1   3/2017

OTHER PUBLICATIONS

International Search Report issued May 28, 2021 in PCT/EP2021/060973 filed on Apr. 27, 2021, 2 pages.
(Continued)

*Primary Examiner* — Benjamin A Kaplan
(74) *Attorney, Agent, or Firm* — Oblon, McClelland, Maier & Neustadt, L.L.P.

(57) ABSTRACT

A secure element has a secure processor for securely processing the digital information stored in a memory external to the secure element, and a loading and pre-processing system configured to load the digital information from the external memory into the secure element, and pre-process said digital information by executing a cryptographic algorithm before processing said digital information by the secure processor. The system reads a version number of the digital information that has been loaded, from an internal memory of the secure element, and uses said version number in executing the cryptographic algorithm.

14 Claims, 4 Drawing Sheets

(58) Field of Classification Search
USPC .......................................................... 726/26
See application file for complete search history.

(56) References Cited

U.S. PATENT DOCUMENTS

| | | |
|---|---|---|
| 2018/0204025 A1 | 7/2018 | Chhabra et al. |
| 2021/0019429 A1* | 1/2021 | Cooner ................. G01J 1/4204 |
| 2021/0049263 A1* | 2/2021 | Kiperberg ............. G06F 21/575 |

OTHER PUBLICATIONS

Extended European Search Report & Written Opinion issued Jul. 15, 2020 In European Application 20 175 606.1 filed on May 20, 2020, citing document 1 therein, 9 pages.

* cited by examiner

SECURE ELEMENT FOR SECURELY PROCESSING DIGITAL INFORMATION

TECHNICAL FIELD

The present disclosure relates to the field of computer security and more precisely to securely processing digital information, such as codes (applications) and/or data.

BACKGROUND

Generally, a processing device that can securely process digital information, also known as a secure element, for example a smart card or a chip, includes hardware resources such as one or more processors (e.g. a host processor and a secure processor), and one or more memories (volatile memory, cache memory and non-volatile memory). The processing device usually operates under control of an operating system and executes program instructions by using one or more software components or applications. When an application is executed, the digital information (code and data) required for the application and the data produced by the application can be stored in a non-volatile memory and, when required to be executed or processed, the digital information may be loaded in a volatile memory or cache memory.

The secure element may be embedded in a SoC (System on the Chip) having several processing modules, several memories and several functionalities. The SoC may be integrated in a larger module, for example a IoT device (Internet of Things device).

In a constraint environment like an IoT system, the secure element may have only a small non-volatile memory, such as an OTP (one time programmable) memory, that is used to store a limited amount of information, typically counters and/or keys. The secure element is not used to store the digital information (e.g. code and/or data). To keep the cost of the secure element low, the digital information is stored in an external non-volatile memory located outside the secure element (for example a flash memory in the SoC or in the module outside the SoC). This external memory has a large storage capacity, for example of several megabytes, higher than the internal storage capacity of the secure element. The digital information stored in the external memory shall be protected with a high security level equivalent to the security level of the secure processor. More precisely, it should be secured in privacy, integrity, authenticity and freshness. Regarding the freshness, it means that the digital information should be protected against a replay attack (also known as playback attack), that is a form of network attack in which a valid data transmission is maliciously or fraudulently repeated or delayed.

The secure element needs to be protected against malicious attacks, in particular against replay attacks. A replay attack (also known as playback attack) is a malicious attack in which a hacker eavesdrops on a valid data transmission, intercepts it, and then fraudulently delays or repeats it to misdirect a receiver (in this case, the secure element) into doing what the hacker wants.

The secure element has a loader that securely imports the external digital information in an internal memory such as a RAM (Random-Access Memory). When a piece of digital information is imported, it shall be verified whether or not it has been replaced by a previous version of said piece of digital information that is no longer valid.

EP 2 860 660 discloses a data processing system including a SoC having a host processor (HCPU) and associated host memories, a secure processor (SCPU) and associated secure memories, a secure cache memory storing a plurality of cache lines and a cache controller that controls loading the cache lines from the host processor to the secure processor. The cache memory stores an integrity table containing a fingerprint of each cache line, that has been computed using a hash function. When a cache line is loaded into the secure processor, its integrity is verified by successfully comparing a fingerprint of the cache line computed by the secure processor and the corresponding fingerprint extracted from the integrity table.

Such a solution requires to load an integrity table into the internal memory (e.g. a RAM) of the secure element. For example, in case that the external memory stores 1 MB of digital information and the digital information is segmented in pieces of 1 KB having each a fingerprint or TAG of 32 B, the integrity table to be stored in the internal memory RAM of the secure element should have a storage capacity of 32 KB. For a processing device having little storage capacity, like an IoT device, such a solution may not be appropriate because it requires too much storage capacity in the secure element.

The present disclosure intends to improve the situation.

SUMMARY

The present disclosure concerns a secure element for securely processing digital information, said digital information being segmented and stored in a plurality of M segments in a memory external to the secure element, including:
- a secure processor for securely processing the plurality of M segments of digital information;
- a system configured to load a segment of digital information from the external memory into the secure element, and pre-process said segment of digital information by executing a cryptographic algorithm before processing said segment of digital information by the secure processor;

wherein the system is configured to determine an identification information of the segment of digital information that has been loaded, the determination of said identification information including obtaining a version number of said segment of digital information, and to execute the cryptographic algorithm by using said identification information; characterized in that the system is configured to load a version table containing the respective version numbers of the plurality of M segments of digital information, from the external memory into an internal memory of the secure element, and to read the version number of each segment of digital information that is loaded in the version table stored in the internal memory.

Thus, the cryptographic algorithm uses the version number of the digital information stored in the external memory (or a piece of the digital information stored in the external memory) as an input. The version number of the digital information is cryptographically used to pre-process said the digital information (or piece of digital information). It is associated with the digital information (or with the piece of digital information) in the external memory and loaded into the secure element. The version number can have an initial value (e.g. zero) and be incremented each time the digital information (or the piece of digital information) is modified, for example during processing by the secure element. The digital information (or the piece of digital information) is cryptographically bound to its version number. The secure element stores internally this version number, which requires low memory capacity. Thanks to that, the secure element is protected against malicious replay attacks without requiring high capacity storage. So, the present disclosure can be applied to low-end devices that need a good security level.

Advantageously, the system is configured to determine the identification information of the segment of digital information, the determination of said identification information further including obtaining a segment identifier of said segment of digital information, and to execute the cryptographic algorithm by using said identification information, said segment identifier being either an index assigned to the corresponding segment of digital information in the external memory or an identifier present in a header of the corresponding segment of digital information.

The identifier of the digital information (or piece of digital information) can be cryptographically used, in addition to its version number, to pre-process the digital information.

The identifier is a short piece of information, for example an index of the piece of digital information in the external memory. Typically, the digital information is divided in pieces of digital information, that are indexed and stored in the external memory. The pieces of digital information can be stacked or more generally arranged in given positions in the external memory. The indexes that are assigned to the pieces of digital information can depend on the positions of these pieces of digital information in the external memory.

Advantageously, said secure element stores at least one unique cryptographic key, that was generated uniquely for the secure element, to be used by the system in executing the cryptographic algorithm.

The use of the version number prevents from a substitution of the digital information (or piece of digital information) by an earlier version of the digital information. The use of the identifier of the digital information (or piece of digital information) prevents from a substitution of the digital information by another valid digital information of loaded in the secure element. The use of a unique key prevents from a substitution of the digital information by a digital information from another secure element or device. The combined use of the version number, the identifier and the unique key allows to have a solution equivalent to the TAG solution of the prior art, which implicitly protect from many different attacks, but without requiring a high storage capacity.

The system can comprises a key derivation function to generate at least one cryptographic key, to be used by the cryptographic algorithm, by using the at least one unique cryptographic key and the identification information of the digital information as inputs.

The cryptographic algorithm can comprise an authentication algorithm to authenticate the segment of digital information that has been loaded. Alternatively, or additionally, the cryptographic algorithm can comprise a decryption algorithm to decrypt the digital information that has been loaded. Thus, the version number and/or the identifier of the digital information (or piece of digital information) can be used not only for the authentication but also for the decryption of the digital information, which increases the security.

For example, the system is configured to generate an initialization vector, to be used by the decryption algorithm, by using the identification information of the segment of digital information as an input.

The digital information stored in the external memory can be protected by an authenticated encryption mechanism, for example based on an approach "Encrypt-then-MAC". In that case, it is required to authenticate and then decrypt the digital information, before processing securely the digital information in the secure element. With such a configuration, the use of the version number and the identifier of the digital information as inputs for its authentication provides the highest level of security. Indeed, the digital information will not be decrypted if this authentication is unsuccessful.

Advantageously, the system is further configured to verify a freshness information of said version table by comparing said freshness information of the version table with a freshness counter stored in an internal non-volatile memory of the secure element.

The freshness or coherence of all the pieces of digital information is authenticated by the version table. Using the version numbers of the pieces of digital information, instead of their TAGs (fingerprints), allows to spare internal storage resources in the secure element. For example, in case of an external memory storing 1 MB of digital information stored in pieces or fragments of 1 KB having each a TAG like a MAC of 32 B, the size of the integrity table containing the TAGs of all the pieces of digital information would be 32 KB. In the present disclosure, if we assume that the version number has a size of a few bytes, for example 3 B, the size of the version table that needs to be stored in the secure element is only 3 KB. So, the present disclosure allows to spare 29 KB of internal storage capacity.

The verification of the freshness information of the version table ensures the security by building a chain of trust for freshness (anti-replay).

The internal non-volatile memory can be OTP (One Time Programmable) memory.

The system can be configured to load the version table in a startup procedure of the secure element.

Advantageously, the system is configured to authenticate and decrypt the version table that has been loaded.

The system can be configured to read the freshness information from a header of the version table.

Advantageously, the secure element comprises an update module configured, in case that a segment of digital information (or piece of digital information) is modified when it is processed by the secure processor, to control an operation of writing the modified segment of digital information and an updated version table in the external memory, and incrementing the freshness counter in the internal non-volatile memory.

A second aspect of the disclosure concerns a system including the secure element as previously defined and an external memory for storing the digital information.

A third aspect of the present disclosure concerns a method for securely processing digital information by a secure element, said digital information being segmented and stored in a plurality of M segments in a memory external to the secure element, including the following steps, performed by the secure element, of:
  loading a segment of digital information from the external memory into the secure element;
  determining an identification information of the segment of digital information that has been loaded by obtaining a version number of said segment of digital information;
  pre-processing said segment of digital information by executing a cryptographic algorithm using said identification information before processing said segment of digital information by a secure processor of the secure element;
  securely processing the segment of digital information by the secure processor;
characterized in that the method further comprises a step of loading a version table containing respective version numbers of the plurality of M segments of digital information from the external memory into an internal memory of the secure element and a step of reading the version number of each segment of digital information that is loaded in the version table stored in the internal memory.

The method can further comprise a step of verifying a freshness information of said version table by comparing said freshness information of the version table with a freshness counter stored in an internal non-volatile memory of the secure element.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
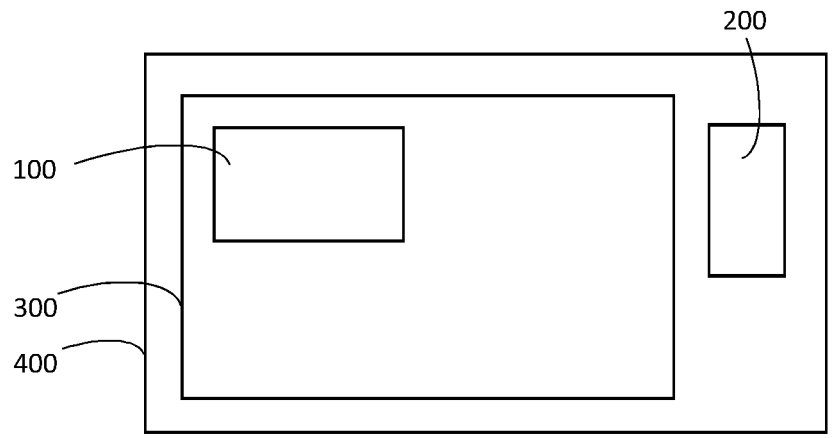
FIG. 1 shows a secure element embedded in a SoC (System on the Chip), according to a first embodiment.

FIG. 1 shows a system including a secure element 100 and an external memory 200 (i.e., a memory external to the secure element 100), according to a first embodiment. The secure element 100 is for example a smart card or a chip. It can be embedded in a SoC (System on Chip) 300 having several processing units, several memories and several functionalities (not represented). The SoC 300 may be integrated in a larger module 400. The external memory 200 is external to the secure element 100. It can be built on a different silicon substrate of a secure processor of the secure element 100. For example, the external memory is arranged in the module 400, outside the SoC 300. However, the external memory 200 could be disposed in the SoC 300. For example, this larger module 400 could be an IoT device (typically provided with a unique identifier and the ability to transfer data over a network), a telecommunication apparatus, a location system, a vehicle like a car or a plane, etc. Examples of IoT devices include smart meters, smart cameras, sensors, trackers, tags, detectors, monitors, wearable items and clothing, smart home devices, medical and health-care devices, life science devices, set-top boxes, and edge devices in telecommunication networks such as 5G networks.

Different illustrative use cases (not limitative) of the secure element 100 are given below.

In a first use case, the secure element 100 can be integrated in a modem of a telecommunication system or apparatus. In such a case, the secure element 100 can handle network authentication and download secure applications.

In a second use case, the secure element 100 can be integrated in a tachograph and securely handle location data.

In a third use case, the secure element 100 can be integrated in a vehicle, for example a car or a plane, to secure and manage safety data transport.

The external memory 200 stores digital information. The terms "digital information" designate data liable to be loaded into the secure element 100, such as executable code or information generated by executable code or used by executable code, or any other data to be used or processed by the secure element 100.

The secure element 100 is intended to load, pre-process (or read) and securely process the digital information stored in the external memory 200, as explained later in the description.

The external memory 200 can be a non-volatile memory.

In the present embodiment, memory segmentation is used in the external memory 200. It means that the digital information is segmented and stored in segments (also called 'fragments'). A segment of digital information is a piece of digital information resulting from a segmentation. The segmentation is used to store, transfer and pre-process the digital information.

For example, the external memory 200 stores M segments of digital information referred as 'Si', with $1 \leq i \leq M$. The M segments Si can include M1 segments of code and M2 segments of data, with $M1 \geq 0$ and $M2 \geq 0$. The segments of digital information can have the same size or have respective sizes that may be different, depending on the implementation. In some embodiments, the secure element 100 has a cache implementation. In that case, the secure element 100 can have a cache controller (typically a cache hardware component) configured to load and store cache lines (corresponding to segments of digital information) of a predetermined size. In other embodiments, the segments of digital information could be pieces of digital information requested by the secure processor, when executing a software component or an application. In such a case, the segments could have different respective sizes.

The segments of digital information Si are protected by an authenticated encryption algorithm to ensure security during storage in the external memory 200 and during transfer from the external memory 200 to the secure element 100. In the first embodiment, the authenticated encryption used to protect the digital information is based on the well-known "Encrypt-then-MAC" (EtM) approach. The EtM approach is considered as a very robust approach for authenticated encryption. For each segment of digital information Si, the external memory 200 stores the element [Si] |$MAC_{[Si]}$, containing the segment Si encrypted with an encryption key (described later) and concatenated with the authentication element $MAC_{[Si]}$ of the encrypted segment [Si] computed with an authentication key (also described later). The authentication element $MAC_{[Si]}$ can be calculated by a MAC function.

In the present disclosure, the brackets '[ ]' represent the encrypted form of an element and the symbol '|' represents the concatenation of two elements.

A version number Vi is attributed to each segment of digital information Si and incremented when this segment of digital information Si is modified by the secure element 100.

The size of the version number Vi of one segment of digital information Si can be small, generally a few bytes, for example 3 bytes. Initially, when the digital information is stored in the external memory 200, the version numbers Vi of all the segments Si of digital information with 1≤i≤M can be set to an initial value, for example zero (but it could be one or any other value). Then, each time one specific segment (here referred as 'Sj') among the M segments Si is modified, its version number Vj is incremented, for example by one (i.e., Vj=Vj+1).

In addition, in the first embodiment, each segment of digital information has an associated segment identifier referred as $ID_{Si}$. This segment identifier $ID_{Si}$ is a short piece of information that identifies the segment. The segment identifier $ID_{Si}$ can be an index of the segment Si in the external memory 200. Typically, indexes are assigned to the segments of digital information Si in the external memory 200, for example depending on the respective positions of the segments Si stored in the external memory 200. These indexes can be used as segment identifiers $ID_{Si}$ by the secure element 100. They can also be used to index the version numbers Vi of the segments Si in the version table. In case of a cache implementation in the secure element 100, cache block addresses are given by addresses to fetch code or load data and can be used as segment (or block) identifiers $ID_{Si}$. These cache block addresses correspond to the indexes of the blocks (segments) in the external memory 200. The same cache block addresses can be used to index the version numbers in the version table.

In the present embodiment, the version number Vi and the identifier $ID_{Si}$ of each segment of digital information Si stored in the external memory 200 are used in the authenticated encryption algorithm as inputs. For example, the authentication algorithm, such as a MAC algorithm, used to authenticate the segment Si, uses an authentication key k1_Si that is derived from a master key k1 (or source key k1) by a key derivation function (KDF) that takes the version number Vi and the identifier $ID_{Si}$ of the segment Si as inputs, as expressed below:

$$k1\_Si=KDF(k1,Vi,ID_{Si})$$

Additionally, in order to increase the security, the version number Vi and the identifier $ID_{Si}$ of the segment Si can also be used to encrypt the segment of digital information Si. For example, the encryption algorithm uses an encryption key k2_Si that is derived from a master key k2 (or source key k2) by a key derivation function (KDF) that takes the version number Vi and the identifier $ID_{Si}$ of the segment Si as inputs:

$$k2\_Si=KDF(k2,Vi,ID_{Si})$$

The keys k1 and k2 can be secret keys. Advantageously, these keys k1 and k2 are generated uniquely for the secure element 100. They can be generated by the secure element 100 itself. The keys k1 and k2 are different in the first embodiment. However, they could be the same key in other embodiments.

All the encrypted and authenticated segments [Si] |MAC$_{[Si]}$ (with 1≤i≤M) are stored in the external memory 200. They can be stacked (and ordered) in a memory area of the external memory 200.

Figure 2:
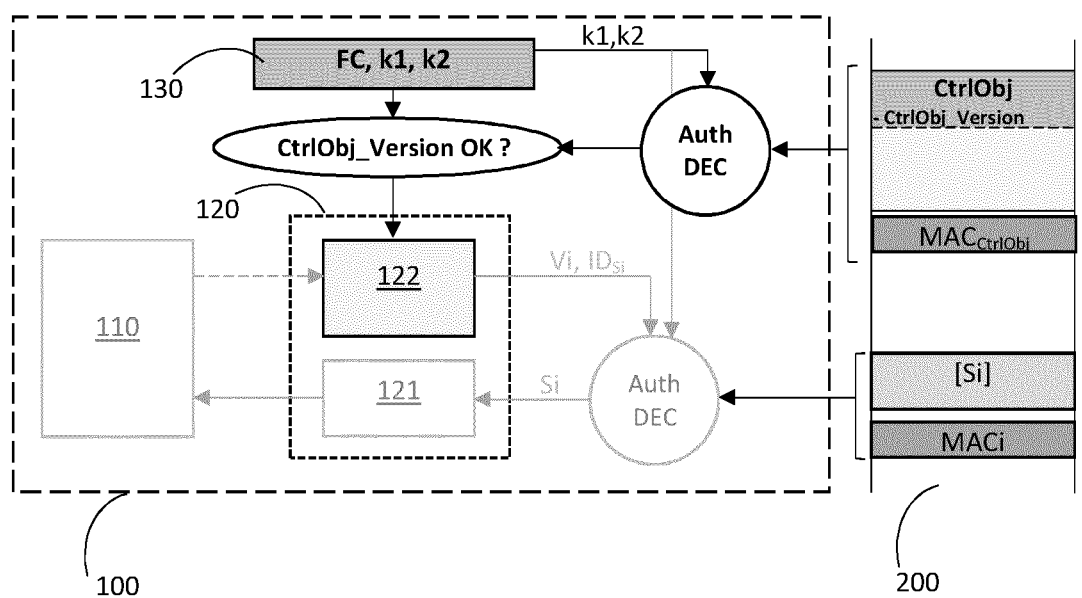
FIG. 2 shows the secure element and an external memory operating during a startup procedure, in a simplified manner, according to the first embodiment.
Figure 3:
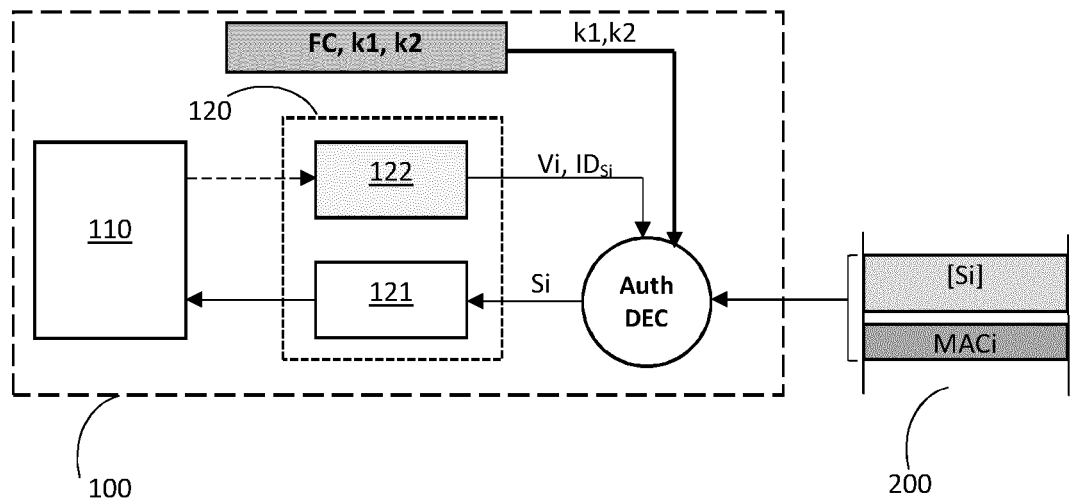
FIG. 3 shows the secure element and the external memory operating during a procedure of loading and pre-processing (or reading) the digital information from the external memory, in a simplified manner, according to the first embodiment.
Figure 4:
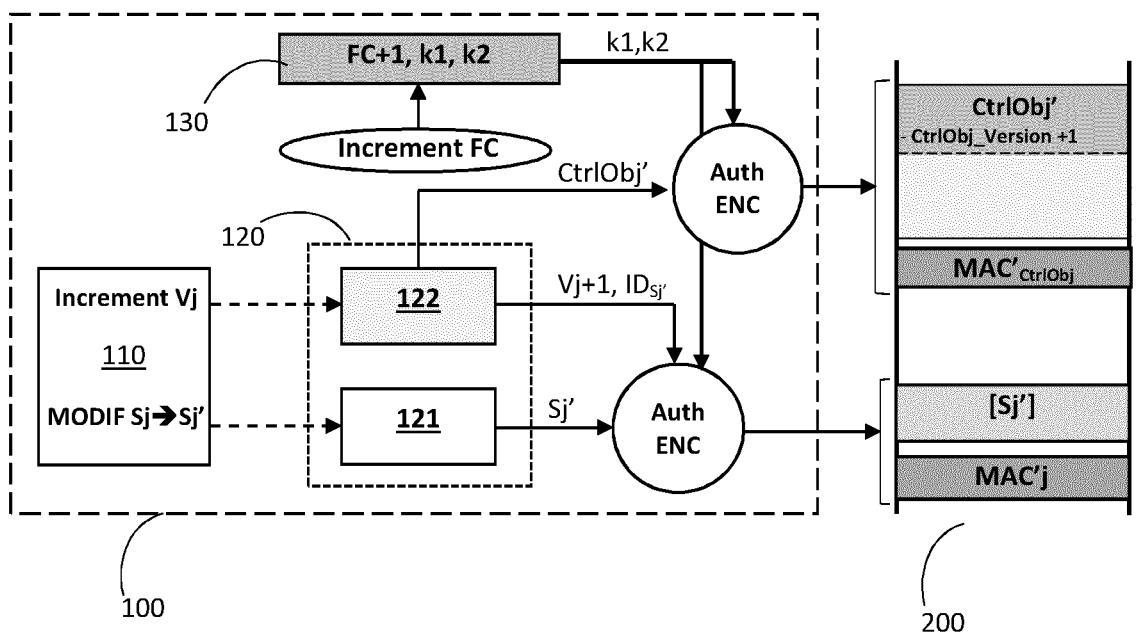
FIG. 4 shows the secure element and the external memory operating during a procedure of writing a modified piece of digital information and an updated version table into the external memory, in a simplified manner, according to the first embodiment.

The external memory 200 further stores a version table, referred as "CtrlObj" in FIGS. 2-4. The version table CtrlObj contains the respective current (valid) version numbers Vi of all segments of digital information Si (with 1≤i≤M) stored in the external memory 200. The version numbers Vi contained in the version table CtrlObj can be arranged in the same order as the segments Si are arranged in the external memory 200. More generally, the version numbers Vi in the version table CtrlOb can be indexed in the same manner as the corresponding segments Si are indexed in the external memory 200. This allows to identify the segments Si by their ordering numbers or indexes. Alternatively, the segments of digital information could have segment identifiers in a segment. These segment identifiers present in the headers of the segments could be associated with the version numbers Vi in the version table CtrlObj.

Furthermore, a freshness information is attributed to the version table CtrlObj. Typically, this freshness information is a version number of the version table, referred as 'CtrlObj_Version'. This freshness information has an initial value, for example zero, that is attributed to the version table CtrlObj when the digital information is initially stored in segments in the external memory 200. It can be incremented each time the content of the version table CtrlObj is modified, as will be explained later. The freshness information CtrlObj_Version of the version table CtrlObj is stored in the external memory 200, for example in a header of the version table CtrlObj.

The version table CtrlObj can also be protected for its storage in the external memory 200 and its transfer between the secure element 100 and the external memory 200, for example by using an authenticated encryption algorithm. For example, the version table CtrlObj is encrypted with the key k1 and then an authentication element of the version table CtrlObj (here in encrypted form) is computed with a authentication algorithm, such as a MAC algorithm, using the key k2. The external memory 200 stores the encrypted version table [CtrlObj]$_{k1}$ and its authentication element MAC$_{[CtrlObj]}$. Any other authenticated encryption algorithm may be used.

The secure element 100 comprises a secure central processing unit CPU (or secure processor) 110, a plurality of internal memories 121, 122, 130 and a loading and preprocessing system 140.

The secure CPU 110, also known as a secure processor, has security features having a high assurance level certification for security-critical applications. It can be an integrated hardware intellectual property core (IP core).

A first internal memory 121 is for storing segments of digital information Si before processing by the central processing unit 110. It is for example a cache memory.

A second internal memory 122 is for storing the version table CtrlObj, of the segments of digital information requested by the secure CPU 110. It can be a volatile memory, such as a RAM.

The first and second internal memories 121, 122 are part of an internal volatile memory system 120. They can be separate memories or different areas of one memory.

A third internal memory 130 is a persistent (non-volatile) memory for storing data like keys and counters. More precisely, the internal memory 130 can store keys, like the master keys k1 and k2, to be used in the cryptographic algorithms executed by the loading and pre-processing system 140 or by the secure processor 110 and the freshness counter 'FC' related to the version table CtrlObj. The persistent internal memory 130 can be an OTP (One Time Programmable) non-volatile memory.

The loading and pre-processing system 140 has several functions including:
  the function of loading the version table CtrlObj from the external memory 200 into the secure element 100,
  the function of loading pieces (segments) of digital information from the external memory 200 into the secure element 100, the function of pre-processing the version table CtrlObj to be stored in the second internal memory 122 (RAM), the function of pre-processing the pieces (segments) of digital information to be stored in the first internal memory 121 (cache memory) and to be processed by the secure processor 110, and the function of checking the freshness of the loaded version table CtrlObj.

Figure 7:
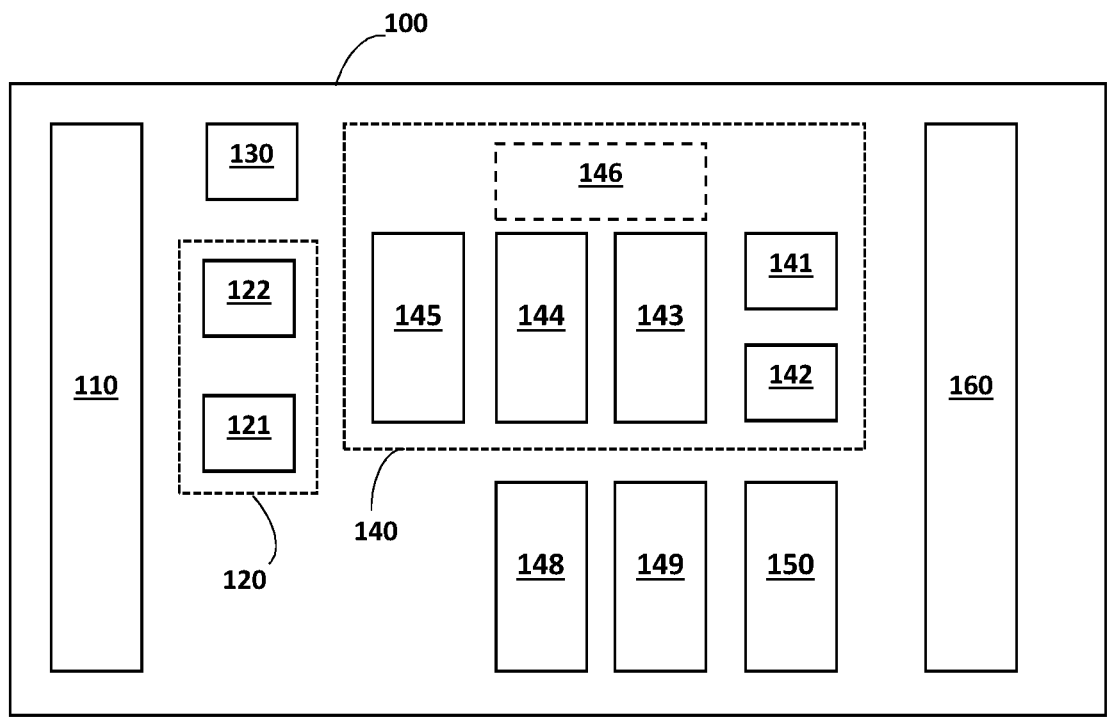
FIG. 7 represents schematically the secure element according to the first embodiment.

These functions of the loading and pre-processing system 140 are implemented by components 141-145, described below. They can be hardware components, or software components, or by a mix of hardware components and software components. The secure processor 110 is arranged to execute the software components. In FIG. 7, the components 141-145 are represented outside the secure processor 110 but they could be arranged at least partially inside the secure processor 110 (in particular the software components).

The loading and pre-processing system 140 has a first loader 141, a second loaded 142, an authentication verification module 143, a decryption module 144 and a freshness checking module 145 (or anti-replay checking module).

The first loader 141 is for loading the version table CtrlObj from the external memory 200. The second loader 142 is for loading segments of digital information Si from the external memory 200.

The authentication verification module 143 is configured to authenticate loaded data, such as the version table CtrlObj and segments of digital information Si. In the present embodiment, it implements a MAC function and a key derivation function KDF to derive keys from the master key k1, using the version numbers and the identifiers of these segments as inputs, to be used as authentication keys to authenticate the segments of digital information.

The decryption module 144 is configured to decrypt loaded data, such as the version table CtrlObj and segments of digital information Si. In the present embodiment, it implements a decryption algorithm and a key derivation function KDF to derive keys from the master key k2, using the version numbers and the identifiers of these segments as inputs, to be used as decryption keys to decrypt the segments of digital information.

Alternatively, the key derivation function could be implemented in one separate component 146 (represented by a dashed block in FIG. 7), used by both the authentication verification module 143 and by the decryption module 144.

The freshness checking module 145 is configured to check the freshness of the version table CtrlObj with respect to the internal freshness counter FC in the OTP memory 130, when this version table CtrlObj is loaded from the external memory 200, as will be described later in the description of the method of securely processing digital information.

The secure element 100 can further include an update module 150 for updating the external memory 200, when the secure processor 110 has modified one or more segments of digital information, as explained later in the description.

A host processor or CPU (not represented) could be provided outside the secure element 100, for example in the SoC 300, to execute some operations under control of the secure element 100, for example loading the version table or the segments. Thus, loading could be performed through a system bus or a host CPU, upon request of the secure element 100.

The secure element 100 has other cryptographic functions, including a function of cryptographic encryption and an authentication function like a MAC function, that allow the secure CPU 110 to encrypt and authenticate data (typically segments of digital information and the version table CtrlObj), as explained later. The function of cryptographic encryption and the authentication function are implemented by components 148, 149. The latter are either software components, or hardware components, or a mix of hardware and software components.

The secure processor, or secure central processing unit (CPU), 110 is configured to securely process or use the pieces of digital information loaded in the internal (cache) memory 121. It is intended to execute security-critical applications. The secure processor 110 is also configured to control the operations of the secure element, such as the authenticated decryption and the authenticated encryption. In addition, when a segment of digital information has been modified during processing, the secure CPU 110 can control the update of the version table CtrlObj in the internal memory 122 and also the update of the persistent memories 200 and 130 (i.e., the update of the modified segment(s) and the version table CtrlObj in the external memory 200 and the update of the freshness counter FC in the internal memory 130) that has to be carried out by an atomic transaction.

The update module 150 has the function of incrementing the freshness counter in the OTP memory 130 and updating the external memory 200, when a segment of digital information has been modified during processing, under control of the secure processor 110, as will be explained later. It can be based mostly on software. The action of incrementing the freshness counter in the internal OTP memory 130 and the action of updating the external memory 200 by writing the modified segment of digital information and the updated version table in the external memory 200 are advantageously executed together by a single atomic transaction, for functional reasons.

The secure element 100 has also a hardware interface 160 to directly access the external non-volatile memory 200.

The components of the secure element 100 are advantageously trusted, which means that they cannot be manipulated to induce faults.

Figure 5:
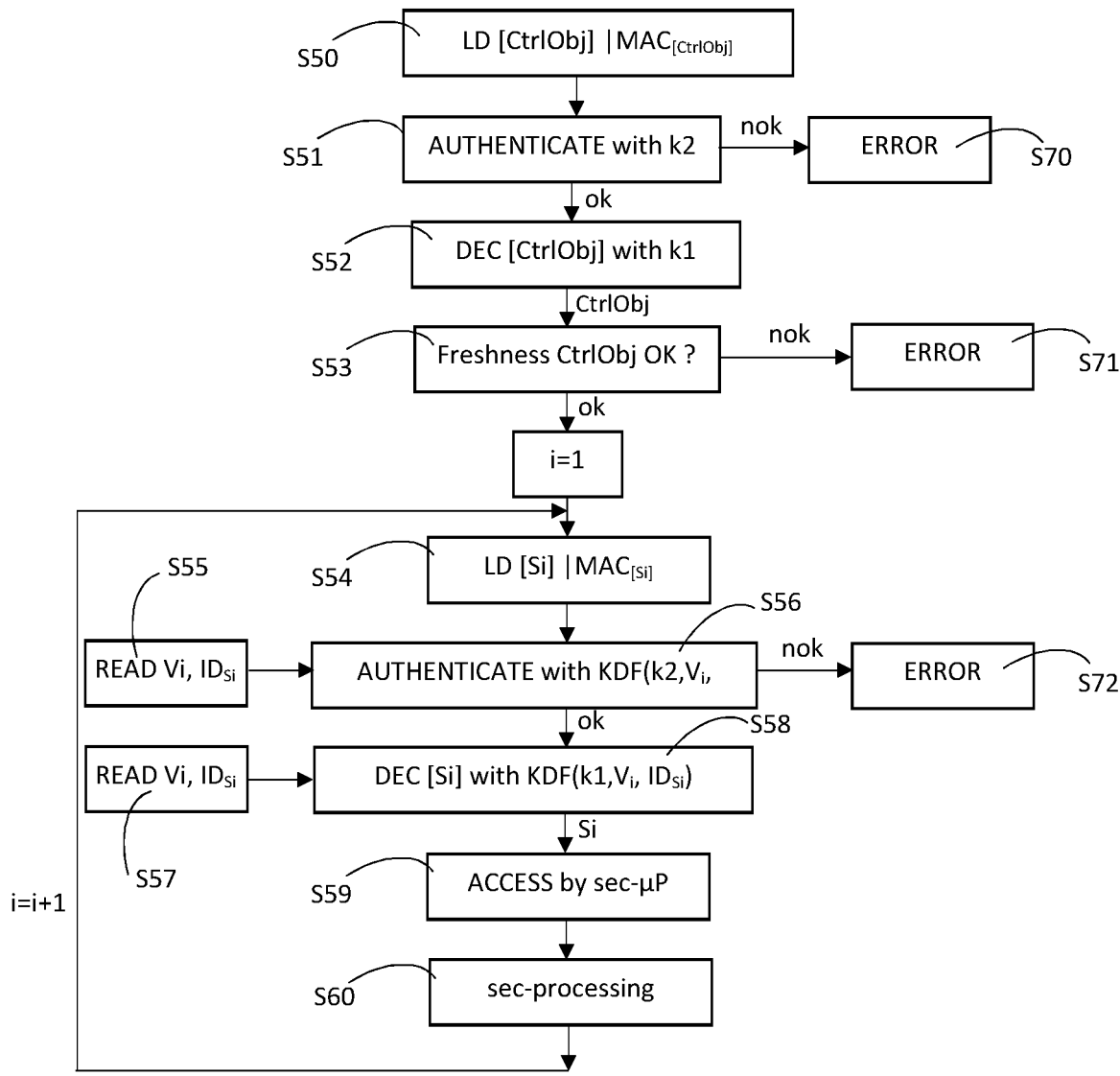
FIG. 5 shows a flowchart of a method of securely processing digital information, performed by the secure element, the digital information being stored in the external memory, according to the first embodiment.
Figure 6:
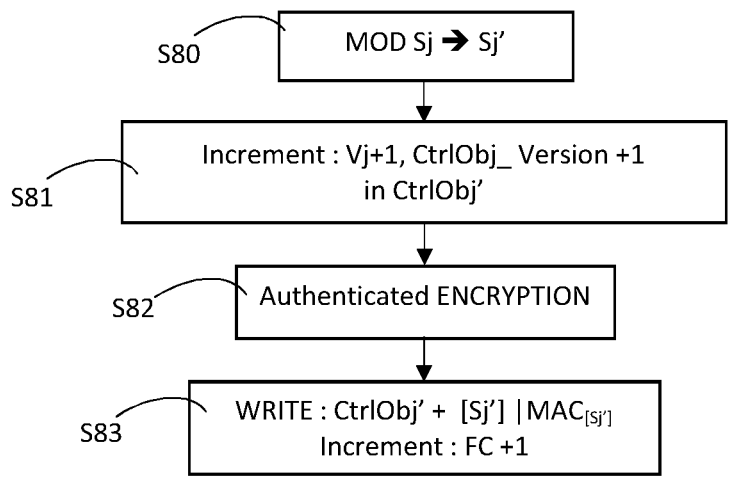
FIG. 6 shows a flowchart of an update procedure executed when a piece of digital information has been modified by the secure element, according to the first embodiment.

The method of securely processing digital information stored in the external memory 200 by the secure element 100 will now be described with reference to the FIGS. 2-6. The method can be divided into three procedures:

a startup procedure, that is executed after switching on the secure element 100 (FIGS. 2 and 5);

a reading or pre-processing procedure, that follows the startup procedure and is executed before securely processing digital information by the secure processor 110 (FIGS. 3 and 5); and a updating procedure, that is executed when a piece of digital information is modified during processing by the secure processor (FIGS. 4 and 6).

Startup Procedure (FIGS. 2 and 5)

Initially, the secure element 100 is switched on. Subsequently, a booting or startup procedure is executed by the secure element 100. During this startup procedure, the secure element 100 can execute a security protocol (e.g., secure boot) that can secure the boot process. In the startup procedure, the first loader 141 loads the version table CtrlObj read from the external memory 200, in a step S50. More precisely, the version table CtrlObj in encrypted form and concatenated with its MAC, $[CtrlObj]_{k1} | MAC_{[CtrlObj]}$, is loaded from the external memory 200 to the secure element 100. Then, the authentication verification module 143 authenticates the version table CtrlObj, in a step S51. To this end, the authentication verification module 143 compute a MAC of the encrypted version table loaded, $[CtrlObj]_{k1}$, using the key k2, and compares the computed MAC with the MAC loaded with the version table MAC$_{[CtrlObj]}$. If the authentication is successfully achieved, the encrypted version table [CtrlObj]$_{k1}$ is decrypted by the decryption module 144, in a step S52, using the key k1. If the authentication is unsuccessful, the step S51 is followed by an error step S70. For example, in the error step S70, the method for processing the digital information is aborted (interrupted).

After authentication with the key k2 and decryption with the key k1 of the version table CtrlObj, the freshness of the version table CtrlObj is checked by the freshness verification module 145, in a step S53. To this end, the freshness information CtrlObj_Version, included in the header of the version table CtrlObj, is compared to the freshness counter FC stored in the OTP memory 130.

If the freshness information CtrlObj_Version of the version table CtrlObj matches the freshness counter FC stored in the OTP memory 130, the freshness of the version table CtrlObj is successfully checked and the method proceeds with the steps S54 to S59 of loading and pre-processing segments of digital information Si. If the check of the freshness of the loaded version table is unsuccessful, the method goes to an error step S71. For example, in the error step S71, the method for processing the digital information is aborted (interrupted).

Reading or Pre-Processing Procedure (FIGS. 3 and 5)

The startup procedure is followed by a reading or pre-processing procedure, performed by the secure element 100, for reading or pre-processing segments of digital information from the external memory 200.

The loading and pre-processing procedure includes the steps S54 to S59 (described below) that are repeated iteratively for each of a plurality of segments of digital information Si, with 1≤i. During the loading and pre-processing procedure, the index 'i' represents the order in which some segments of digital information are successively fetched in the external memory 200 and then pre-processed by the secure element 100 over time. This order of fetching (or the order of loading) does not necessarily correspond to the order in which the segments of digital information are stacked in the external memory 200. In other words, when Si is assumed to be a segment of digital information currently loaded and pre-processed by the secure element 100, Si+1 is the next segment of digital information to be loaded and pre-processed. But Si and Si+1 may not be consecutively stacked segments in the external memory.

In the step S54, a segment of digital information Si in protected form is loaded. More precisely, the second loader 142 loads the element [Si]|MAC$_{[Si]}$ containing the segment of digital information Si encrypted with the key k1_Si and concatenated with the authentication element MAC$_{[Si]}$ of the encrypted segment [Si] computed with the key k2_Si.

In the step S55, the authentication verification module 143 obtains the version number Vi from the version table CrtlObj stored in the internal memory 122. It also obtains the segment identifier ID$_{Si}$ from the version table CtrlObj as this ID$_{Si}$ corresponds to the index of the version number Vi in the version table CtrlObj. Then, in a step S56, the authentication verification module 143 authenticates the encrypted segment [Si], by computing a MAC of [Si] and comparing it with the MAC$_{[Si]}$ loaded with [Si]. To compute this MAC, the module 143 derives the key k2_Si from the master key k2 read in the memory 130 and uses the version number Vi and the identifier ID$_{Si}$ of the segment Si (read in the step S55) as inputs of the key derivation function. If the authentication is successfully achieved (i.e., the computed MAC matches the loaded MAC), the encrypted segment [Si] is then decrypted by the decryption module 143, in a step S58. The decryption uses a key k1_Si computed from the master key k1 (read from the memory 130), and uses the version number Vi and the identifier ID$_{Si}$ of the segment Si, obtained from the version table CtrlObj stored in the memory 122 in the step S57, as an input of the key derivation function (KDF). If the authentication is unsuccessful, the step S56 is followed by an error step S72. For example, in the error step S72, the method for processing the digital information is aborted (interrupted). Instead, the segment of digital information Si could be deleted.

During the pre-processing procedure, in the steps S55 and S57, the loading and pre-processing system 140 obtains the version number Vi and the identifier ID$_{Si}$ of the segment of digital information Si from the internal memory 122 (e.g. RAM), and provides this identification information of the segment Si as an input in executing the cryptographic algorithms of authentication and decryption used to pre-process the segment Si. Alternatively, the identification information of the segment Si from the version table CtrlObj stored in the internal memory 122 may be used by only one of the two cryptographic algorithms, preferably by the authentication algorithm. However, the security is increased if decryption uses the identification information of the segment Si as well.

Instead of using the segment version number and the segment identifier as inputs to generate the decryption key, the version number Vi and the segment identifier ID$_{Si}$ may be used to generate an initialization vector IV to be used by the decryption module 144 for decrypting the segment of digital information [Si].

After authentication and decryption of the segment of digital information Si, the segment Si is loaded into the cache memory 121 of the secure processor 110 in a step S59.

Then, in a step S60, the segment of digital information Si is accessible by the secure processor 110 and can be securely processed by the secure processor 110. For example, the secure processor executes a secure (or security-critical) application by processing the segment of digital information Si.

The steps S54 to S59 are repeated iteratively for segments of digital information Si successively loaded from the external memory 200 into the secure element 100, unless the process is aborted beforehand due to an error.

Update Procedure (FIGS. 4 and 6)

When a segment of digital information (here referred as 'Sj' with 1≤j≤M) is processed by the secure processor 110, it might be modified during its processing, in a step S80. The modified version of the segment of digital information Sj is referred as Sj'. In such a case, an update procedure is achieved and will now be described with reference to FIGS. 4 and 6.

When the initial segment Sj is changed into the modified segment Sj', the secure processor 110 updates the version table CtrlObj stored in the internal memory 122 by incrementing the version number of the modified segment Sj' in the version table CtrlObj stored in the internal memory 122, in a step S81. If we assume that the version number of the initial segment Sj is Vj, the new version number of the modified segment Sj' is Vj+1. In the step S81 of updating the version table CtrlObj in the internal memory 122, the secure processor 110 also updates the version number of the version table CtrlObj, CtrlObj_Version, here in the header of the version table CtrlObj stored in the internal memory 122. The version number of the version table CtrlObj, CtrlObj_Version, is incremented by one (CtrlObj_Version=CtrlObj_Version+1). The updated version table (stored in the internal memory 122) is referred as CtrlObj'.

The secure element 100 also needs to update the external memory 200. More precisely, it needs to write the modified piece of digital information Sj' and the updated version table CtrlObj' in the external memory 200. To this end, the secure processor 110 submits the updated version table CtrlObj' and the modified segment Sj' to an authenticated encryption algorithm, in a step S82, before controlling a transfer of the modified segment Sj' and updated version table CtrlObj' to the external memory 200. The same authenticated encryption algorithm as the one used to prepare the data stored in the external memory is used. In the present embodiment, the authenticated encryption algorithm follows an Encrypt-then-Mac approach. The encryption of the version table CtrlObj' uses the key k1, and the MAC function applied to $[CtrlObj']_{k1}$ uses the key k2. The encryption of the modified segment of digital information Sj' uses the derived key k1_Vj+1, where k1_Vj+1=KDF(k1, Vj+1, $ID_{Sj}$). It should be noted that the segment identifier of the modified segment Sj' is the same as the segment identifier of the corresponding segment Sj (before modification). The authentication of the modified segment of digital information in encrypted form [Sj'] uses the derived key k2_Vj+1, where k2_Vj+1=KDF (k2,Vj+1, $ID_{Sj}$).

Then, in a step S83, under control of the secure processor 110, the update module 150 increments the freshness counter FC of the version table in the OTP memory 130, and writes the new version table CtrlObj' and the amended segment of digital information Sj' in the external memory 200. The freshness counter FC is here incremented by one. All these actions (incrementing FC in the internal memory 130 and writing CtrlObj' and Sj' in the external memory 200) are executed together by a single atomic transaction. Such an operation has only two persistent states: an original state without the modification and a final state with the modification. The operation can be quick or take a long time.

A procedure analogous to the above update procedure can be carried out initially by the secure element 100 to store the segments of digital information in encrypted and authenticated form in the external memory 200. The secure element 100 can have a firmware secure loader configured to securely load the digital information to be stored in the external memory from a digital information provider, for example through a communication network or through a local connection to another machine. The secure element can be configured to segment the loaded digital information in segments of digital information, authenticate and encrypt these segments (in the same manner as described in the update procedure for the modified segment Sj') and write them in the external memory, generate a version table CtrlObj, authenticate and encrypt this version table (in the same manner as described in the update procedure) and then write it into the external memory.

A second embodiment is based on the first embodiment an only differs from it by the authenticated encryption algorithm. In the second exemplary embodiment, the authenticated encryption follows an approach of the type "MAC-then-Encrypt-then-MAC". This approach consists, for each segment of digital information Si, in computing a first MAC '$MACi_1$' of the segment Si in clear using a first key k0_Vi (derived from a master key k0 and using the version number Vi as an input), then encrypting the segment Si and the first MAC concatenated together (i.e., Si|$MACi_1$) with a second key k1_Si (derived from a master key k1 and using the version number Vi as an input), and then computing a second MAC '$MACi_2$' of the result of the encryption (i.e., [Si]|[$MACi_1$]) using a third key k2_Si (derived from a master key k2 and using the version number Vi as an input), to obtain the protected segment [Si]|[$MACi_1$]|$MACi_2$.

A third embodiment is based on the first or the second embodiment and differs from them only in that the identification information of the segment of digital information used in the authentication operation and/or in the decryption operation as an input, only contains the version number of the segment of digital information. Such an embodiment is appropriate for example in case that the secure element loads only one segment or piece of digital information.

Different types of MAC function could be used. For example, a CMAC function (Cipher-based Message Authentication Code), that is a block cipher-based message authentication code algorithm, or a HMAC algorithm (hash-based message authentication code), that is a specific type of message authentication code (MAC) involving a cryptographic hash function and a secret cryptographic key, could be used. Instead of a MAC function, any other authentication function could be used.

The invention claimed is:

1. A secure element for securely processing digital information, said digital information being segmented and stored in a plurality of M segments in a memory external to the secure element, the secure element comprising:

a secure processor configured to securely process the plurality of M segments of digital information;

a system configured to load a segment of digital information from the external memory into the secure element, and pre-process said segment of digital information by executing a cryptographic algorithm before processing said segment of digital information by the secure processor;

wherein the system is configured to determine an identification information of the segment of digital information that has been loaded, the determination of said identification information including obtaining a version number of said segment of digital information, and to execute the cryptographic algorithm by using said identification information; and wherein the system is configured to load a version table containing the respective version numbers of the plurality of M segments of digital information, from the external memory into an internal memory of the secure element, and to read the version number of each segment of digital information that is loaded in the version table stored in the internal memory.

2. The secure element according to claim 1, wherein the system is configured to determine the identification information of the segment of digital information, the determination of said identification information further including obtaining a segment identifier of said segment of digital information, and to execute the cryptographic algorithm by using said identification information, said segment identifier being either an index assigned to the corresponding segment of digital information in the external memory or an identifier present in a header of the corresponding segment of digital information.

3. The secure element according to claim 1, wherein said secure element stores at least one unique cryptographic key, that was generated uniquely for the secure element, to be used by the system in executing the cryptographic algorithm.

4. The secure element according to claim 3, wherein the system comprises a key derivation function to generate at least one cryptographic key, to be used by the cryptographic algorithm, by using the at least one unique cryptographic key and the identification information of the digital information as inputs.

5. The secure element according to claim 1, wherein the cryptographic algorithm comprises an authentication algorithm to authenticate the segment of digital information that has been loaded.

6. The secure element according to claim 1, wherein the cryptographic algorithm comprises a decryption algorithm to decrypt the segment of digital information that has been loaded.

7. The secure element according to claim 6, wherein the system is configured to generate an initialization vector, to be used by the decryption algorithm, by using the identification information of the segment of digital information as an input.

8. The secure element according to claim 1, wherein the system is further configured to verify a freshness information of said version table by comparing said freshness information of the version table with a freshness counter stored in an internal non-volatile memory of the secure element.

9. The secure element according to claim 1, wherein the system is configured to load the version table in a startup procedure of the secure element.

10. The secure element according to claim 1, wherein the system is configured to authenticate and decrypt the version table that has been loaded.

11. The secure element according to claim 1, further comprising an update module configured, in case that a segment of digital information is modified when it is processed by the secure processor, to control an operation of writing the modified segment of digital information and an updated version table in the external memory, and incrementing the freshness counter in the internal non-volatile memory.

12. A system including the secure element according to claim 1 and an external memory configured to store the digital information.

13. A method for securely processing digital information by a secure element, said digital information being segmented and stored in a plurality of M segments in a memory external to the secure element, the method performed by the secure element and comprising:
    loading a segment of digital information from the external memory into the secure element;
    determining an identification information of the segment of digital information that has been loaded by obtaining a version number of said segment of digital information;
    pre-processing said segment of digital information by executing a cryptographic algorithm using said identification information before processing said segment of digital information by a secure processor of the secure element;
    securely processing the segment of digital information by the secure processor;
    wherein the method further comprises
    loading a version table containing respective version numbers of the plurality of M segments of digital information from the external memory into an internal memory of the secure element and a step of reading the version number of each segment of digital information that is loaded in the version table stored in the internal memory.

14. The method according to claim 13, further comprising verifying a freshness information of said version table by comparing said freshness information of the version table with a freshness counter stored in an internal non-volatile memory of the secure element.

* * * * *